United States Patent [19]

Bohn

[11] Patent Number: 4,976,454
[45] Date of Patent: Dec. 11, 1990

[54] SUSPENSION DEVICE FOR VEHICLES

[75] Inventor: Gerhard Bohn, Munich, Fed. Rep. of Germany

[73] Assignee: Messerschmitt-Bölkow-Blohm GmbH, Munich, Fed. Rep. of Germany

[21] Appl. No.: 357,467

[22] Filed: May 26, 1989

[30] Foreign Application Priority Data

May 28, 1988 [DE] Fed. Rep. of Germany ....... 3818179

[51] Int. Cl.⁵ .......................... B60G 17/08; B61F 5/14
[52] U.S. Cl. .................................. 280/707; 280/710
[58] Field of Search ............................... 280/707, 710

[56] References Cited

U.S. PATENT DOCUMENTS 3,861,696  1/1975  Gustafsson .......................... 280/707
4,154,461  5/1979  Schnittger .......................... 280/710

Primary Examiner—Kenneth R. Rice
Attorney, Agent, or Firm—Kenyon & Kenyon

[57] ABSTRACT

A suspension device for vehicles between a spring-mounted passenger car and a chassis with at least one flexible spring and a damping element connected in parallel to the spring. The damping element is an active damping element with a controllable damping ratio, which features an hydraulic piston, a first bypass with constant throttle action and a second bypass with a throttle valve, whereby the throttle valve is connected to a controlling device, which opens or closes the throttle valve, as a function of the excursion rate of the flexible spring or of the lateral acceleration values of the passenger car and of the chassis.

6 Claims, 3 Drawing Sheets

SUSPENSION DEVICE FOR VEHICLES

BACKGROUND OF THE INVENTION

The present invention relates to a suspension device for vehicles, especially for railborne high-speed vehicles, which is arranged between the passenger car and the chassis and which has at least one flexible spring with low oscillation frequency, as well as a damping element connected in parallel to this spring.

Up to now, the suspension devices with spring action used for passenger cars in railroad and magnetic track systems have usually been purely passive. When the traffic systems attain higher speed ranges higher, demands are made on the spring action of the suspension device. If a passive suspension system is used, these demands can only be met, to the detriment of the passengers' comfort.

To decouple the passenger car, as far as vibrations are concerned, from the irregularities of the tracks, the springs must be flexible. In order to prevent the passenger car from being subjected to too high acceleration rates, when during lateral wind the trains pass each other or when they emerge from a tunnel, the spring action should function, to the greatest degree possible, as a hard coupling.

Since, thereby, the characteristic curve of the spring must have a non-linear form (flexible in the working range, stiff in the end stop ranges), so that deflections are restricted, the result is that powerful disturbances cause high acceleration values to occur.

The reason for having a practical limit for flexible spring systems is that, when the car is subjected to load fluctuations, the more flexible the spring action is, the greater that the spring excursions become. Nevertheless, to be able to achieve spring systems with relatively low frequencies, these systems are provided with so-called level control systems. These level control systems convert the spring system into an active system, whereby, as a rule, in the case of every active spring element, the distance between the spring-mounted mass and the mass which is not equipped with springs is measured, and the spring element is re-adjusted as a factor of this distance. Thus, for example, in the case of active pneumatic springs, the quantity of air in the spring can be modified as a factor of the mentioned distance. Here, the stipulation is that after an adequate recovery time, a preselected nominal distance is set between the spring-mounted mass and the mass which is not equipped with springs.

The operational limits of this type of active spring system are quickly reached, when the oscillation frequency is relatively low, the positioning and resetting rate of the level control system is relatively low and the permissible spring excursion is small or limited, as well as when the load fluctuations, which affect the spring-mounted mass, for example, the car, and especially their time derivations are considered as large.

In order to increase travel comfort, the passenger car must have the lowest possible oscillation frequency. This can be realized, for example, by means of so-called flexible secondary spring systems. These types of secondary spring systems are arranged, for example, in the case of magnetically levitated vehicles, between the suspension chassis and the passenger car. Thereby, the travel of the spring systems must be as short as possible, in order to avoid, for example, rolling motions of the passenger car; on the other hand, the variations in the loads affecting the passenger car over time are relatively greater, especially when there is a lateral wind.

As measurements have shown, for example in the case of a magnetic-levitation transport system with a horizontal spring, which shows a non-linear spring characteristic curve, when travelling over turn outs rail points, acceleration values can appear on the passenger car of up to 2 m/s$^2$ at a speed of up to 190 km/h. The high transverse acceleration, thereby, is a result of the passenger car overshooting into the stiff spring range. This disadvantage is even more noticeable, when trains pass each other, during a lateral wind, whereby acceleration values of up to 12.7 m/s$^2$ can occur and the deflection can reach over 11 cm, with a static deflection of approximately 8.5 cm only.

An active spring element for high-speed railborne vehicles is known from German Published Patent Application No. 35 37 325. It is arranged between a mass, which is not equipped with springs, and a spring-mounted mass of the vehicle. It features a dynamic circuit consisting of a flexible spring with low oscillation frequency and an active actuator connected in series to this spring, whereby the active actuator serves to regulate the clearance level between the two masses to a nominal value. An active spring or damping element is provided parallel to this dynamic circuit. It has a damping or restoring characteristic, which is dependent on the spring excursion and is initially low and then, from the point of a critical spring excursion, becomes progressive in both directions.

The flexible spring can be a pneumatic spring, preferably with a linear spring characteristic curve, while the active actuator is a regulated, hydraulic final controlling element, whose length can be varied in the direction of the spring excursion. The active spring and damping element is an hydraulic power actuator, whereby one should not infer from this publication how this power actuator should now be controlled, to attain the desired effect.

SUMMARY OF THE INVENTION

An object of the present invention is to provide a suspension device for vehicles, especially for high-speed railborne vehicles, which allows flexible roadbeds to be built for these vehicles, while maintaining a consistently high comfort level for the passengers, so that the traveling speed does not even need to be reduced, when a substantial lateral wind occurs.

The above and other objects of the invention are achieved by a suspension device for vehicles, especially for high-speed railborne vehicles, which is arranged between the passenger car and the chassis and has at least one flexible spring with low oscillation frequency, as well as a damping element connected in parallel to said spring, wherein the damping element is an active damping element with a controllable damping ratio, which features an hydraulic piston, a first bypass with constant throttle action and a second bypass with a throttle valve, and that the throttle valve is connected to a controlling device, which opens or closes said throttle valve, as a function of the excursion rate of the flexible spring and of the lateral acceleration values of the passenger car and of the chassis.

Preferably, the controlling device has a first sensor, which measures the spring excursion and is connected to a derivative unit, a second sensor for the transverse acceleration of the passenger car, which is connected to the input of a first filter, a third sensor for the transverse acceleration of the chassis, which is connected to the input of a second filter, as well as a difference signal, which is connected to the outputs of both filters, and a selector module, which is connected to the differential element, as well as to the derivative signal, and whose output is connected to the throttle valve.

The controlling device is preferably designed in a way, such that the damping of the damping element is constant in the middle range of the signals and rises above a preselected nominal value, when the measuring dimensions increase.

In a further preferred exemplified embodiment, an additional spring is provided, whose one end is attached to the lower part of the passenger car and whose other end is attached to an adaptor plate. Parallel to the additional spring, a passive damping element is, thereby, attached between the passenger car and the adaptor plate, while the adaptor plate is connected over an active hydraulic arrangement with the chassis.

The active hydraulic arrangement is advantageously connected to a controlling device, which features a sensor for the excursion of the spring, a setpoint generator, a differential element, a control amplifier and a low-pass filter.

With the refinement of the suspension device, in accordance with the invention, one attains the advantage that the lateral maximum acceleration rates are considerably reduced, so that, even at high speeds, a high degree of ride comfort is maintained. This is especially significant, when inexpensive flexible carrier rails are to be used, whose bowing under load can amount up to 13 mm. Thus, a rail line results, which all the chassis follow within a range of approximately 6.5 mm, at a speed of approximately 400 km/h. If one assumes a carrier rail length of 125 meters, a reference frequency of $f = v/l = 4.4$ Hz results.

BRIEF DESCRIPTION OF THE DRAWINGS

The invention will be described in greater detail in the following detailed description with reference to the drawings, in which.

DETAILED DESCRIPTION

Figure 1:
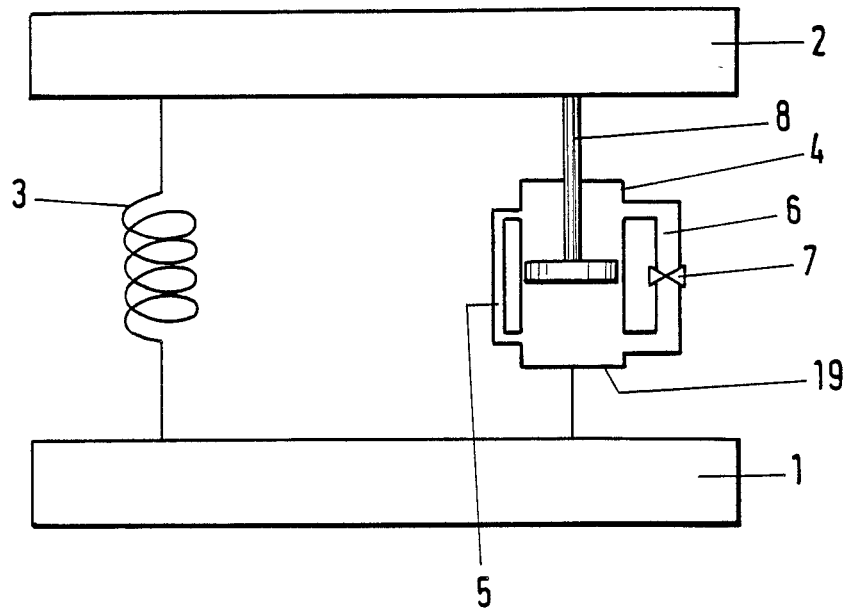
FIG. 1 schematically shows a first exemplified embodiment of a suspension device, according to the invention, for a magnetic-levitation transport system.

With reference now to the drawings, in the case of a high-speed, railborne, magnetic-levitation transport system, the suspension chassis, which is not equipped with a spring, is designated with 1 and a passenger car is designated with 2 in FIG. 1. Between the chassis 1 and the car 2, a flexible spring 3 and an active damping element 4 are provided, which are interconnected in parallel.

The spring 3 can be a pneumatic spring with a low oscillation frequency, which substantially decouples the passenger car from the movements of the chassis and shows, for example, a linear spring characteristic curve.

The active damping element 4 has an hydraulic piston, which is rigidly connected to the passenger car 2, and an hydraulic housing 19, which is connected to the chassis 1. The active damping element 4 is provided with a first bypass 5, which has a relatively narrow cross-section, and with a second bypass 6, which has a larger cross-section and is provided internally with a throttle valve 7. The damping ratio of the damping element 4 can be adjusted with this throttle valve 7. Thereby, the maximum damping ratio is set above the bypass 5, when the throttle valve 7 is closed. Since in the deflected state of the passenger car, the damping action should be negligible, that is a flexible coupling should prevail with the chassis, the throttle valve 7 is preferably controlled according to the excursion rate of the spring 3 or according to the acceleration values of the chassis 1 and of the passenger car 2.

Figure 2:
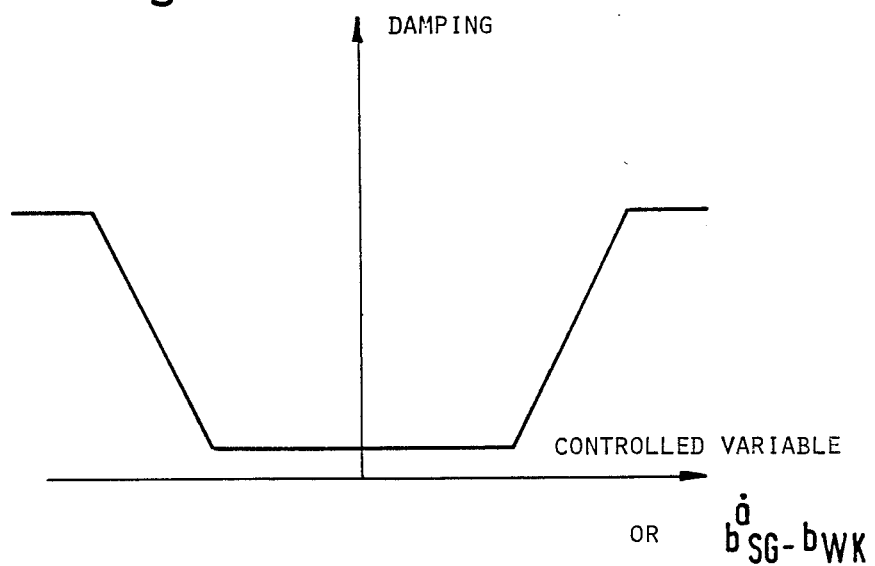
FIG. 2 shows a characteristic diagram for the damping element.

The characteristic diagram of FIG. 2 shows the action of the active damping element (ordinates) as a factor of one of the controlled variables, that is of the excursion rate of the spring a or of the acceleration values $b_{sg}$, $b_{wk}$, whereby the latter two values represent the transverse acceleration rates of the suspension chassis or of the passenger car. In the middle range, the damping action remains constant, so that in normal operation, the magnetic-levitation transport system maintains the same performance as a passive spring action.

Figure 3:
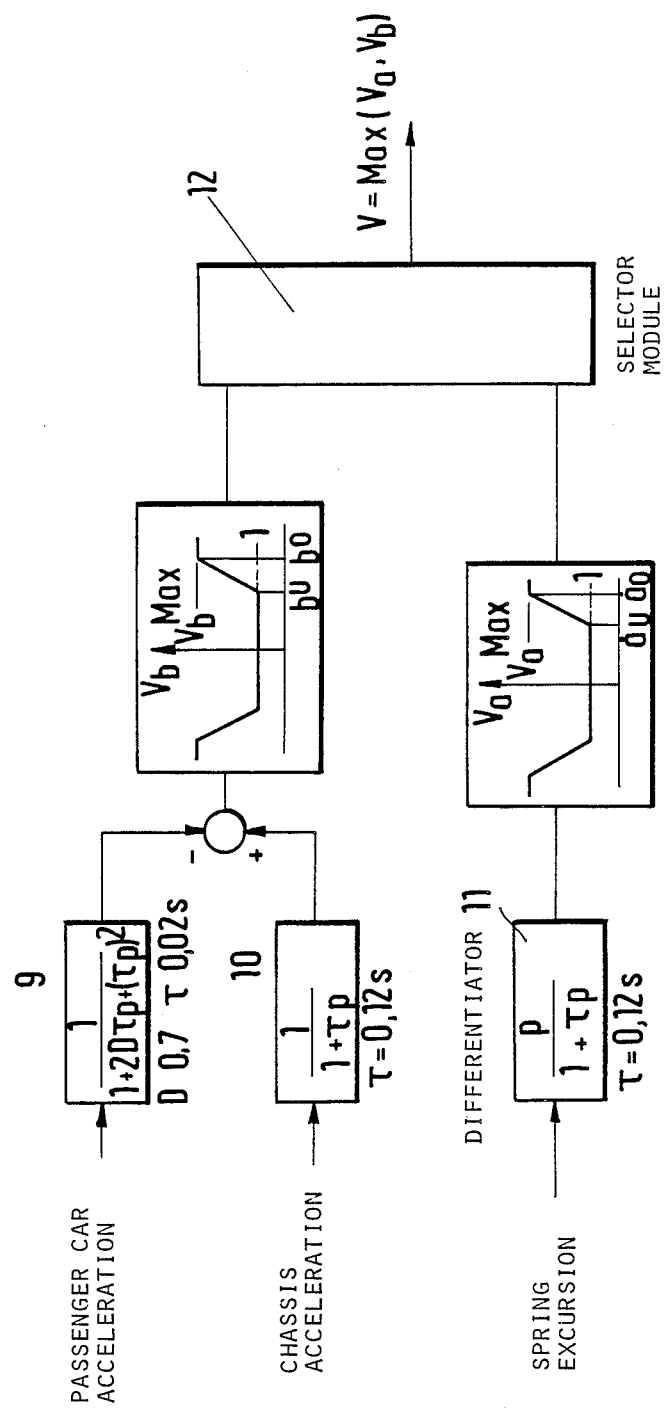
FIG. 3 shows a circuit diagram for controlling the throttle valve in the damping element.

FIG. 3 shows a suitable control algorithm for the throttle valve 7 of FIG. 1. The signals emanating from the appropriate sensors for the acceleration rates of the passenger car and of the chassis or for the spring excursion, must be filtered in accordance with the noise level. Thereby, the acceleration signals pass through the filters 9 and 10, while the signal a for the spring excursion passes through a derivative unit 11, in order to obtain a signal for the spring excursion rate a. By means of a suitable selector module 12, the degree of amplification $V = \max(V_a, V_b)$ is selected for the damping d.

Simulated calculations were made with this type of suspension device for the magnetic-levitation transport system, Transrapid. One was able to reduce the acceleration peak of the passenger car when traveling over rail points to 1.75 m/s$^2$ with the result that the spring excursion no longer exceeded 5 cm. A definite reduction of the acceleration peaks was obtained when the train passed another train during lateral wind. In this case, maximum acceleration rates of 2.6 m/s$^2$ or 2.2 m/s$^2$ resulted for the passenger car, whereby the reverberation magnitudes were accordingly low. The spring excursion is damped nearly aperiodically and rises quickly to its limit position. In this limit position, the damping value is controlled again to its minimum value (FIG. 2), so that again, a minimal coupling with the chassis prevails.

Figure 4:
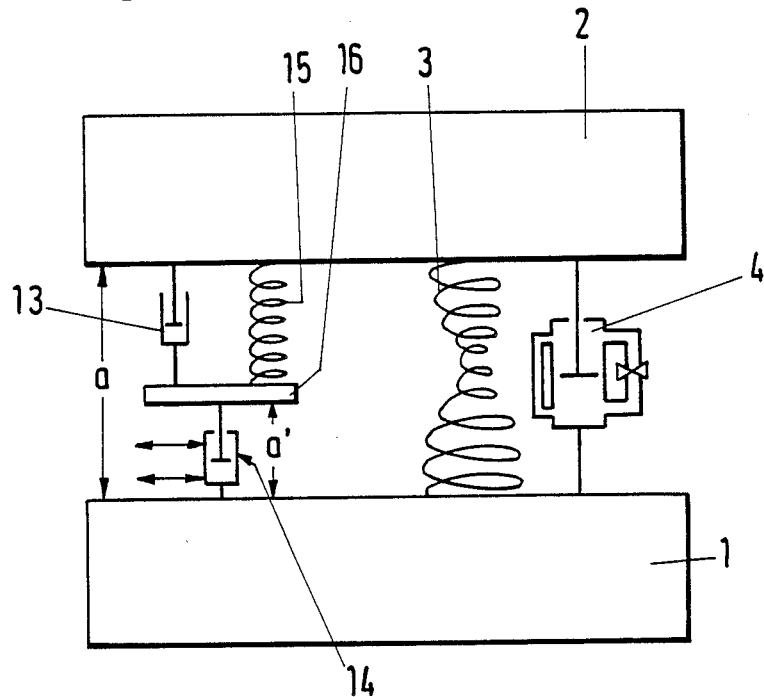
FIG. 4 shows a second exemplified embodiment of a suspension device, according to the invention.

A second exemplified embodiment of a suspension device, according to the invention, is depicted in FIG. 4. Parallel to the flexible spring 3, which in this case shows a non-linear spring characteristic curve, an hydraulically movable adaptor plate 16 is provided, which is connected by way of a spring 15 and a passive damper 13 with the passenger car 2 and, on the other side, is connected by way of an hydraulic arrangement 14 with the chassis 1. This type of arrangement is especially advantageous, when the passenger car is subjected to static loads, such as for example when traveling along a curve or when subjected to a lateral wind, to push the car back to its midposition. Thereby, the main spring 3 works again in the flexible range, so that the traveling comfort is improved. The springs 3 and 15 are reconciled thereby, so that during straight travel with no lateral wind, that is when the platform is not moving, the travel comfort conditions are maintained.

The design of FIG. 4 also has the further advantage, that in a frequency range of up to approximately 10 Hz, the travel comfort can also be improved, as a result of the hydraulic arrangement 14. This is particularly necessary, when one wants to use inexpensive, flexible carrier rails, whose bowing under load amounts up to approximately 13 mm. A rail line results, which the chassis follow within a range of approximately 6.5 mm. At a speed of 400 km/h and with a carrier rail 125 meters, a reference frequency of $f=v/1=4.4$ Hz results. To still maintain the comfort conditions, a passive spring would have to be very flexible and would, therefore, become quite large. It is by far more advantageous, to imitate the performance of a flexible spring by means of the hydraulic arrangement 14, whereby the hydraulic arrangement then works continually opposite the movement of the chassis 1 and, thus, keeps the passenger car 2 at rest.

Figure 5:
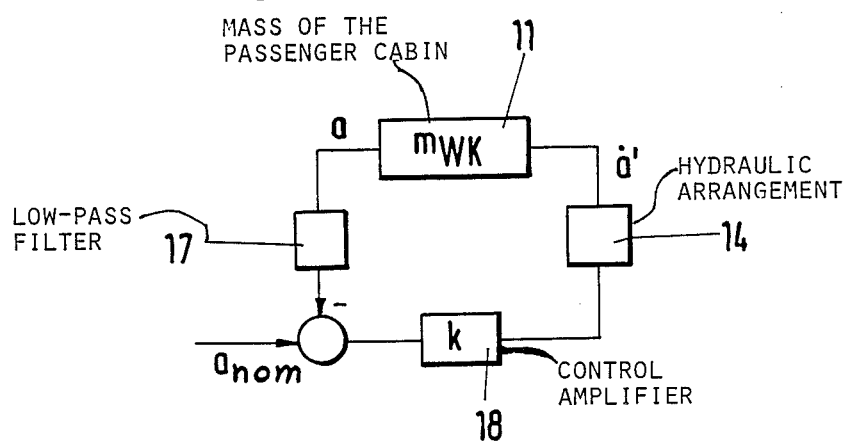
FIG. 5 shows a block diagram of the control loop for the hydraulic arrangement depicted in FIG. 4.

FIG. 5 schematically depicts a block diagram for the control of the hydraulic arrangement 14 as levelling compensation for the adaptor plate 16. Thereby, a low-pass filter is designated with 17, whose time constant preferably is 1 s or more. The actual value a for the spring excursion is compared to the nominal value $a_{nom}$ in a differential element, and the result is transmitted to the hydraulic arrangement 14 by way of a control amplifier 18.

Therefore, the suspension device with active damping elements, according to the invention, offers a flexible spring action in case of small disturbances and a rigid coupling between the passenger car and chassis in case of large disturbances, whereby the traveling speed does not even need to be reduced, when the vehicle is subjected to strong lateral winds.

In the foregoing specification, the invention has been described with reference to specific exemplary embodiments thereof. It will, however, be evident that various modifications and changes may be made thereunto without departing from the broader spirit and scope of the invention as set forth in the appended claims. The specification and drawings are, accordingly, to be regarded in an illustrative rather than in a restrictive sense.

I claim:

1. A suspension device for a vehicle having a body and a chassis, especially a high-speed railborne vehicle, said device being arranged between the body and the chassis and having at least one flexible spring with low oscillation frequency, an excursion rate and a full excursion range, and further including a damping element connected in parallel to said spring, wherein the damping element is an active damping element with a controllable damping ratio, said damping element comprising an hydraulic piston, a first bypass having constant throttle action and a second bypass having a throttle valve, the throttle valve being connected to a controlling device that opens or closes the throttle valve as a function of the excursion rate of the flexible spring or of the lateral acceleration values of the body and the chassis, said first bypass having constant throttle action providing a nominal value of damping when said throttle valve in said second bypass is fully opened, and said damping element having an amount of damping which continuously varies from said nominal amount of damping to a maximum amount of damping over a limited excursion range of said flexible spring less than said full excursion range and having said maximum amount of damping when said throttle valve in said second bypass is completely closed.

2. The suspension device recited in claim 1, wherein the controlling device has a first sensor, which measures the spring excursion and is connected to a derivative unit, a second sensor for the transverse acceleration of the passenger car, whereby said second sensor is connected to the input of a first filter, a third sensor for the transverse acceleration of the chassis, whereby said third sensor is connected to the input of a second filter and has a derivative unit, which is connected to the outputs of both filters, and a selector module, which is connected to the differential element, and to the derivative unit, and whose output is connected to the throttle valve.

3. The suspension device recited in claim 2, wherein the controlling device is designed such a that the damping of the damping element is constant in a middle range of the excursion of the spring and rises when this range is exceeded, said damping rising continuously until said maximum damping is reached when said limited excursion range is achieved.

4. The suspension device recited in claim 1, wherein the first bypass is provided with a safety throttle, which is closed during normal operation and which opens if the throttle valve in the second bypass should fail.

5. The suspension device recited in claim 1, wherein an additional spring is provided, whose one end is attached to the lower part of the car and whose other end is attached to an adaptor plate, and that parallel to the additional spring, a passive damping element is provided between the car and the adaptor plate, while the adaptor plate is connected by an active hydraulic arrangement to the chassis.

6. The suspension device recited in claim 5, wherein the active hydraulic arrangement is connected to a controlling device, which uses a sensor for determining the spring excursion rate and, furthermore, has a setpoint generator, a differential element, a control amplifier and a low-pass filter.

* * * * *

UNITED STATES PATENT AND TRADEMARK OFFICE
CERTIFICATE OF CORRECTION

PATENT NO. : 4,976,454
DATED : December 11, 1990
INVENTOR(S) : Gerhard Bohn It is certified that error appears in the above-identified patent and that said Letters Patent is hereby corrected as shown below:

In column 1, line 14 should read, --...speed ranges, higher demands...-- column 3, line 3 should read --input of a second filter, as well as a difference unit-- line 5/6 should read --...which is connected to the difference signal, as well as ...-- column 5, line 14 should read, --...with a carrier rail length of 1=25 meters-- column 6, line 26, claim 2, should read --and has a difference unit, which is connected to the-- column 3, line 3, delete "signal", and line 6, delete "element".

Signed and Sealed this

Thirtieth Day of June, 1992

*Attest:*

DOUGLAS B. COMER

*Attesting Officer*      *Acting Commissioner of Patents and Trademarks*